(12) United States Patent
Jung

(10) Patent No.: US 7,641,249 B2
(45) Date of Patent: Jan. 5, 2010

(54) APPARATUS FOR MOUNTING ROOF RACK

(75) Inventor: Tae Soo Jung, Siheung-si (KR)

(73) Assignee: Kia Motors Corporation, Seoul (KR)

( * ) Notice: Subject to any disclaimer, the term of this patent is extended or adjusted under 35 U.S.C. 154(b) by 789 days.

(21) Appl. No.: 11/299,353

(22) Filed: Dec. 8, 2005

(65) Prior Publication Data
US 2006/0157524 A1    Jul. 20, 2006

(30) Foreign Application Priority Data
Jan. 20, 2005    (KR) ............... 10-2005-0005421

(51) Int. Cl.
B60R 9/058    (2006.01)
(52) U.S. Cl. .................... 296/1.08; 296/210
(58) Field of Classification Search ............ 296/1.01, 296/1.08, 3, 210, 209, 213
See application file for complete search history.

(56) References Cited

U.S. PATENT DOCUMENTS 3,165,353 A * 1/1965 Weise ............... 296/210
4,768,691 A * 9/1988 Stapleton ........... 224/321
5,636,776 A * 6/1997 Rak et al. ........... 224/322
5,924,614 A * 7/1999 Kuntze et al. ....... 224/321
6,158,639 A * 12/2000 De Silva et al. ..... 224/321
6,557,931 B1 * 5/2003 Tremmel et al. ..... 296/213
6,568,748 B2 * 5/2003 Yoon ................. 296/210
6,769,728 B2 * 8/2004 Albaisa et al. ....... 296/37.7
6,890,012 B2 * 5/2005 Maierholzner ....... 296/24.34
6,974,181 B2 * 12/2005 Mikkaichi et al. .... 296/210
7,201,436 B2 * 4/2007 Ludwig et al. ....... 296/210
7,296,849 B2 * 11/2007 Tremmel et al. ..... 296/210
2003/0038510 A1 * 2/2003 Yoon ................. 296/210
2004/0245796 A1 * 12/2004 Maierholzner ....... 296/37.8

FOREIGN PATENT DOCUMENTS

WO    WO 2004050430    * 6/2004

* cited by examiner

Primary Examiner—Patricia L Engle
(74) Attorney, Agent, or Firm—Morgan, Lewis & Bockius LLP

(57) ABSTRACT

An apparatus for mounting a roof rack including a roof garnish and a bracket for mounting a roof rack, in which the roof garnish and the roof rack mounting apparatus can be separately mounted on a vehicle panel. Due to a simple construction, the roof rack mounting apparatus can be conveniently operated and the mounting costs and time thereof can be reduced.

2 Claims, 5 Drawing Sheets

APPARATUS FOR MOUNTING ROOF RACK

CROSS-REFERENCE TO RELATED APPLICATION

This application is based on and claims priority to Korean Patent Application 10-2005-0005421 filed in the Korean Intellectual Property Office on Jan. 20, 2005, the entire content of which is incorporated herein by reference.

FIELD OF THE INVENTION

The present invention relates to an apparatus for mounting a roof rack.

BACKGROUND OF THE INVENTION

An apparatus for mounting a roof rack (hereinafter, "roof rack mounting apparatus") is used for mounting a roof rack on a roof of a vehicle.

SUMMARY OF THE INVENTION

An embodiment of the present invention is provided, which includes a roof rack mounting apparatus, which is simplified in construction, thereby allowing the manufacturing costs thereof to be reduced and making the roof rack apparatus convenient to use.

There is provided a roof rack mounting apparatus including a roof garnish, a shutter, and a mounting bracket. The roof garnish is formed to be engaged with a vehicle panel, in which the roof garnish is formed with a fitting opening formed through the top portion thereof The shutter is mounted in the fitting opening to be capable of opening and closing the fitting opening. The mounting bracket is fixed on the vehicle panel underneath the fitting opening. The mounting bracket has an arrangement for allowing the roof rack to be mounted on the mounting bracket. The shutter includes a pair of guides and first and second covers. The guides are mounted on the roof garnish to be spaced from each other at a predetermined distance. The first cover is pivotally connected to each guide and the second cover is pivotally connected to the first cover.

As the second cover of the shutter is folded over the first cover or horizontally extended from the first cover, the fitting opening can be opened or closed. Each guide is formed with a guide slot, and the opposite ends of the first cover are engaged in and guided along the guide slots formed in the guides.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
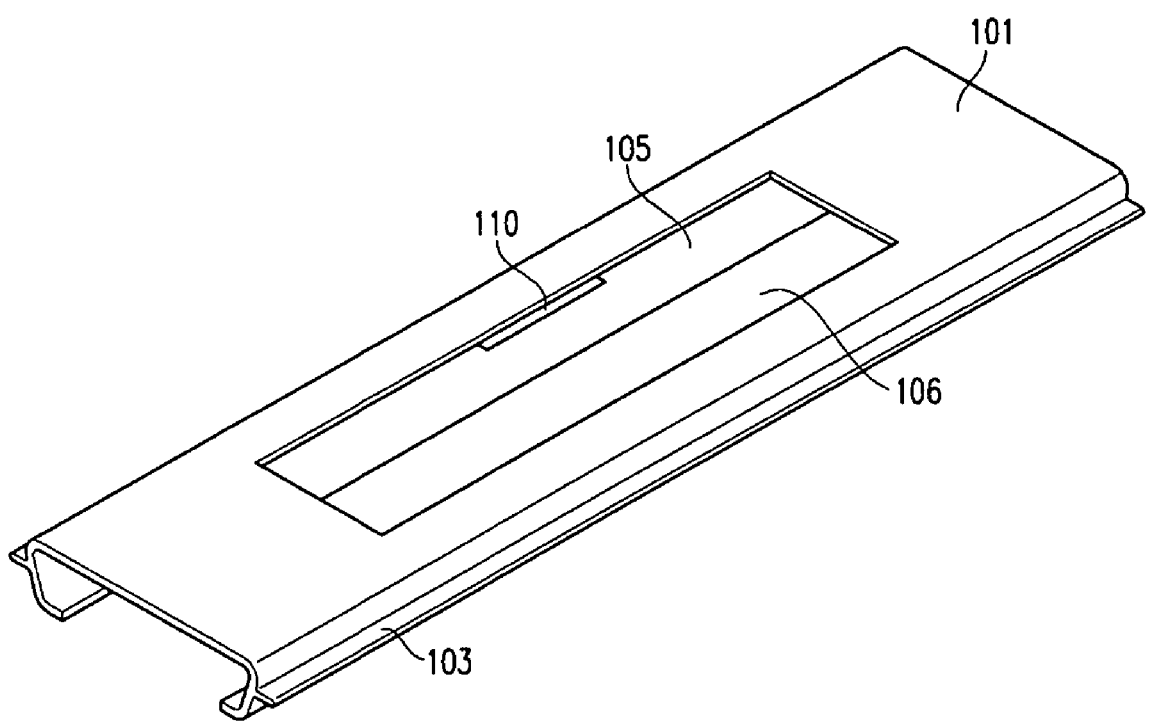
FIG. 1 is a perspective view illustrating a roof rack mounting apparatus according to an embodiment of the present invention.

Hereinafter, an embodiment of the present invention will be described with reference to the accompanying drawings. In the following description and drawings, the same reference numerals are used to designate the same or similar components, and so repetition of the description on the same or similar components will be omitted.

Referring to FIGS. 1 to 4, a roof rack mounting apparatus according to the present invention for use in mounting a roof rack for a vehicle includes a roof garnish 101, a shutter 411, and a mounting bracket 203. The shutter 411 includes a pair of guides 407, a first cover 105, and a second cover 106. The garnish 101 is configured to be capable of being clamped to vehicle panels 301, 303. A fitting opening 201 is formed in the garnish 101 through the top portion. The roof garnish 101 also includes clamping projections 103 formed on the opposite sides of the roof garnish 101, so that the clamping projections 103 may be fitted in a groove formed by a roof panel 301 and a side-out panel 303 of a vehicle body, and a fitting opening 201 within which the shutter 411 may be mounted. The clamping projections 103 are engaged with the lateral walls of the groove formed by the roof panel 301 and the side-out panel 303, thereby securing the roof garnish 101. The shutter 411 is mounted in fitting opening of the roof garnish 101 in such a way that the shutter 411 may open or close the fitting opening 201.

Figure 2:
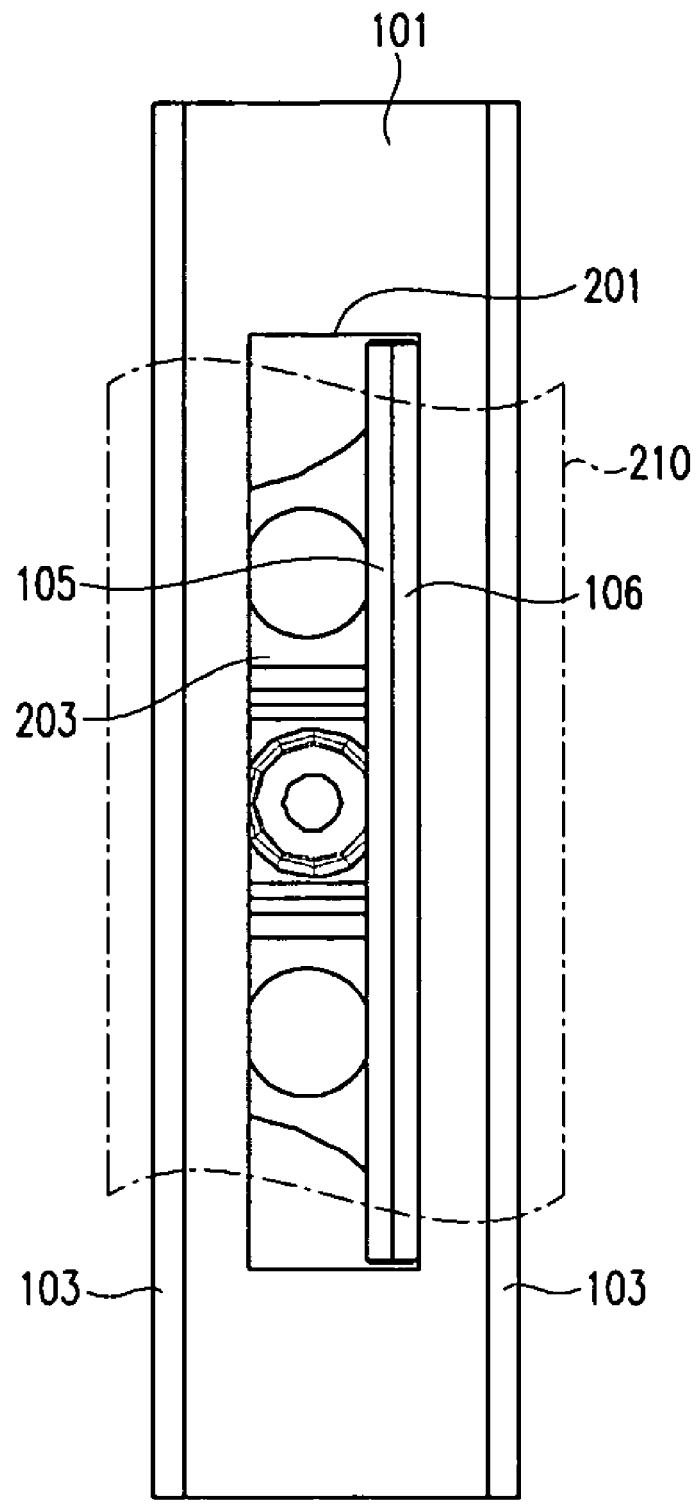
FIG. 2 is a top planar view illustrating the roof rack mounting apparatus in a state in which a cover is opened.
Figure 3:
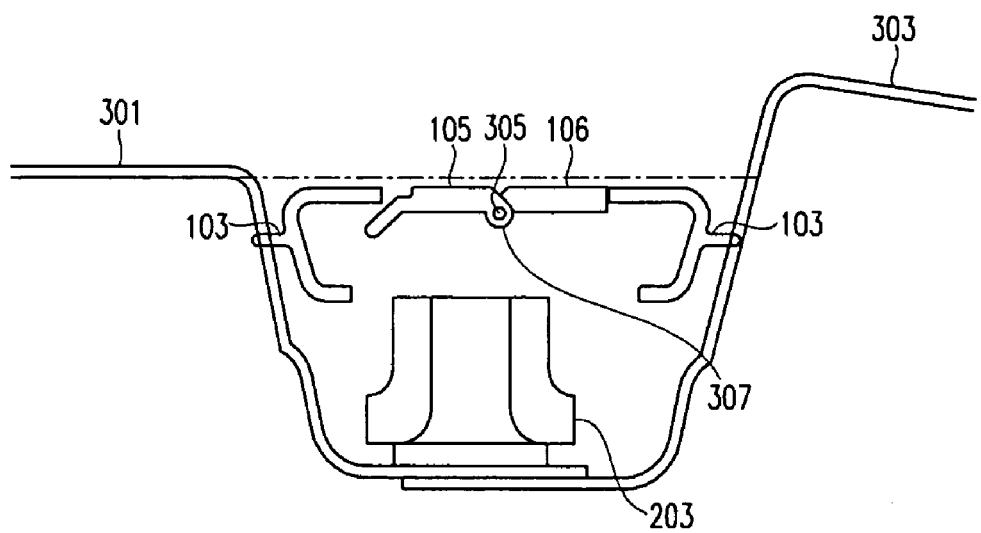
FIG. 3 is a cross-sectional view illustrating an arrangement in which the roof rack mounting apparatus is mounted in a fitting groove.

Referring to FIGS. 2 and 3, the mounting bracket 203 may be located under the fitting opening 203 and clamped to the panels 301, 303 of the vehicle body The mounting bracket 201 may be configured to allow a roof rack 210 to be mounted on the mounting bracket 203. When the shutter 411 is opened, it is possible to mount the roof rack 210 on the mounting bracket 203. According to an embodiment of the present invention, one or more screw holes can be formed in the mounting bracket 203 so as to fasten the roof rack 210 to the mounting bracket 203.

Although FIG. 2 schematically illustrates a roof rack 210, the shape of the roof rack 210 is not limited to the illustrated one.

Because the roof rack mounting apparatus and the mounting bracket 203 according to the present embodiment of the present invention are not interconnected with each other, it is possible to mount any one of them on the vehicle panels 301,303.

Figure 5:
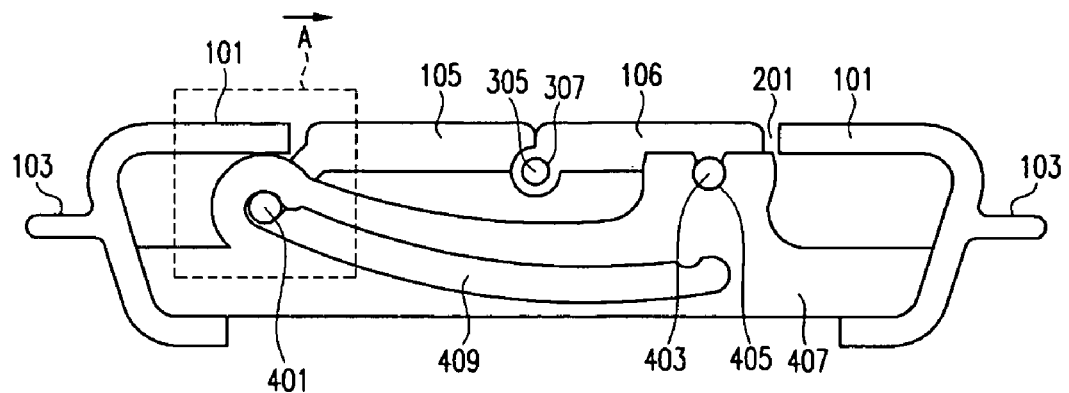
FIG. 5 is a cross-sectional view of the roof rack mounting apparatus.
Figure 6:
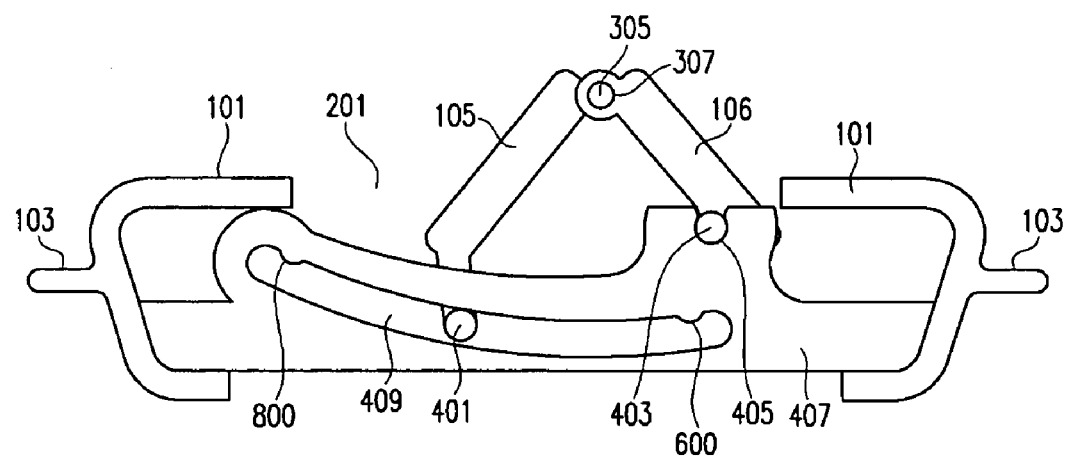
FIG. 6 is a view illustrating the roof rack mounting apparatus while being opened.
Figure 7:
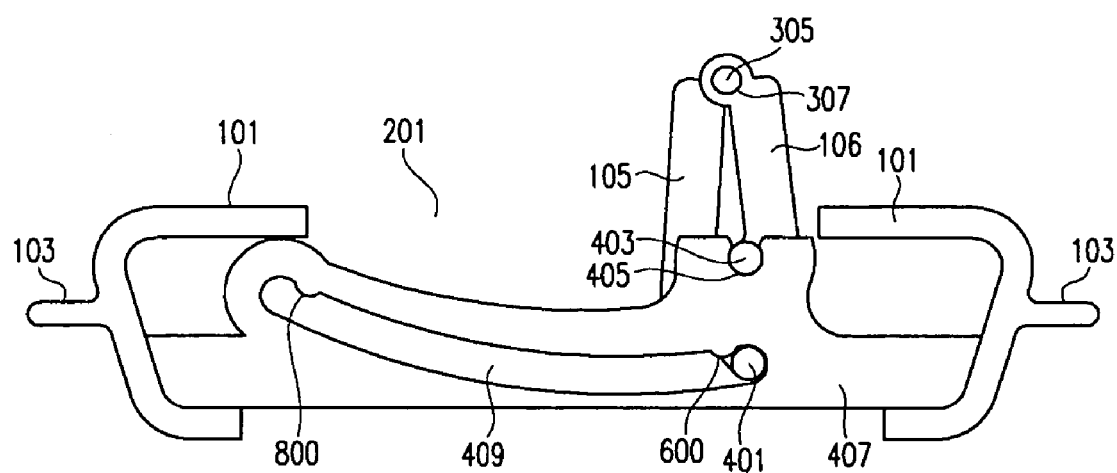
FIG. 7 is a view illustrating the cover of the roof rack mounting apparatus after opened.

FIG. 5 is a cross-sectional view of the roof rack mounting apparatus according to the present embodiment. FIG. 6 shows a procedure of opening the cover of the roof rack mounting apparatus according to the present embodiment. FIG. 7 shows the roof rack mounting apparatus in the state in which the cover is opened.

The guides 407 are mounted in the roof garnish 101 to be spaced from one another at a predetermined distance. More specifically, the guides 407 are respectively mounted under the opposite longitudinal ends of the fitting opening 201 of the roof garnish 101.

Figure 4:
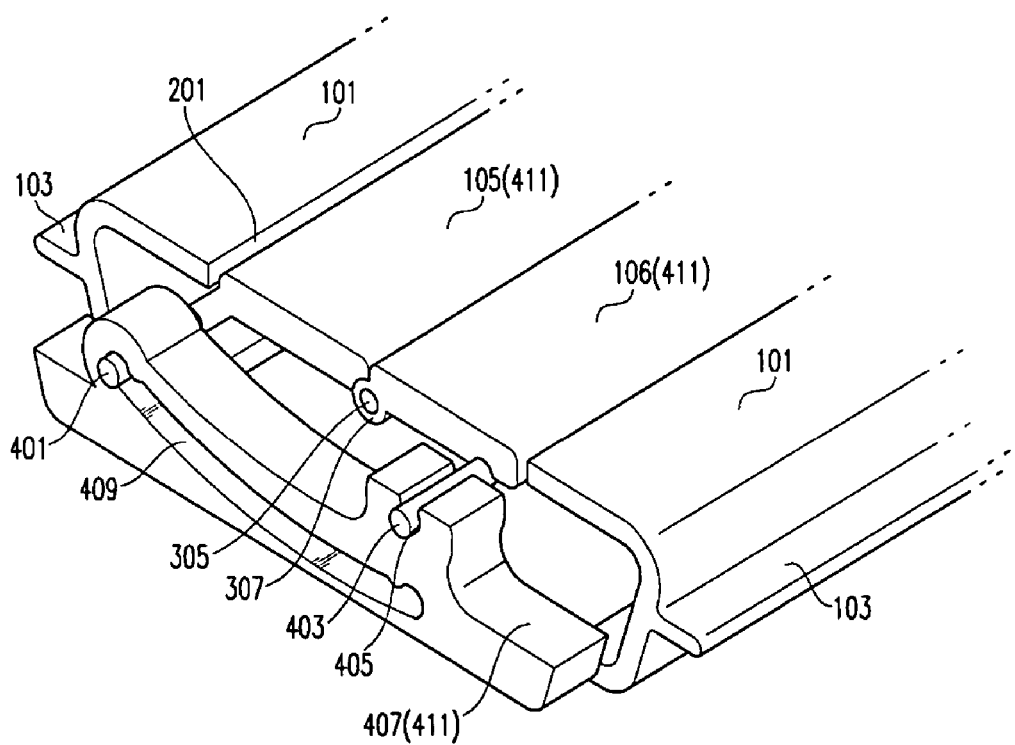
FIG. 4 is a partial perspective view illustrating a cover and a guide of the roof rack mounting apparatus.

Referring to FIG. 1, the first cover 105 is provided with a latch 110 for opening and closing the shutter 411. As shown in FIG. 4, a projection 401 of the first cover 105 is slidably inserted into a guide slot 409 of the guide 407. The edge of the second cover 106 is pivotally connected to the edge of the first cover 105. The first and second covers 105, 106 are connected via a pin 305, so that they can be pivoted in relation to one another. A pin hole 307 is formed along an edge of first and second covers 105, 106, so that the pin 305 may be inserted into the pin hole 307. As the second cover 106 is folded over the first cover 105 or horizontally extended from the first cover 105, the fitting opening 201 can be opened or closed. Each guide 407 is formed with a guide slot 409, and the opposite ends of the first cover 105 are engaged in and guided along the guide slots 409 formed in the guides 407. In addition, each guide 407 is formed with a hole 405 and the projection 403 of the second cover 106 is pivotally fitted in the holes 405 formed in the guides 407.

Referring to FIGS. 4 and 5, the opposite ends of the first cover 105 are formed with projections 401 in such a way that the projections 401 can be engaged in the guide slots 409 formed in the guides 407.

Referring to FIGS. 4 to 7, the shutter 411 mounted in the roof garnish 101 opens and closes the fitting opening 201 in the garnish 101.

As shown in FIG. 5, the fist and second covers 105, 106 close the fitting opening 201 in the roof garnish 103 at the initial position. If force is exerted on the latch 110 in the direction indicated by arrow A, as shown in FIG. 5, the projections 401 of the first cover 105 move along the guide slots 409 formed in the guides 407. In addition, the angle formed between the first and second covers 105, 106 is reduced and the pin 305 that connects the first and second covers 105, 106 is moved upwardly in the direction perpendicular to the direction indicated by arrow A.

Furthermore, the second cover 106 pivots about the holes 405 formed in the guides 407. If the force is continuously applied to the latch 110 in the direction indicated by arrow shown in FIG. 5, the projections 401 of the first cover 105 arrive at the other end of the guide slots 409. In addition, the first and second covers 105, 106 are folded over one another, and the second cover 106 is vertically positioned with respect to the roof garnish 101. As a result, the shutter 411 is formed into the open position and the fitting opening 201 of the roof garnish 101 is exposed.

Each guide 407 has first and second stop projections 600, 800 protruding into a corresponding guide slot 409, in which the first and second projections 600, 800 are formed adjacent to the opposing ends of the corresponding guide slot 409, respectively, as shown in FIG. 7. Also shown in FIG. 7, when the fitting opening 201 is fully opened, the projections 401 of the first cover 105 are temporarily clamped by the stop projections 600 in the guide slots 409. Therefore, the fitting opening 201 can remain opened.

Figure 8:
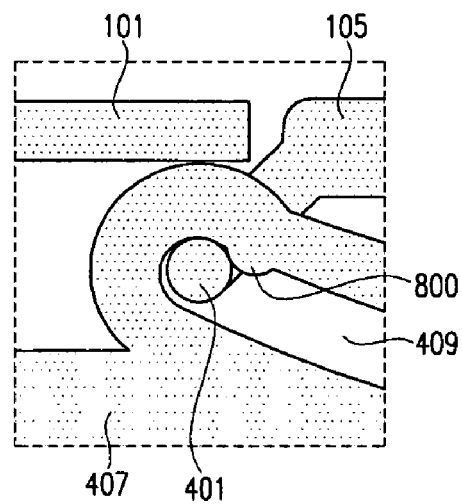
FIG. 8 is an enlarged cross-sectional detail "A" of the roof rack mounting apparatus as shown in FIG. 5.

FIG. 8 is a magnified view of the part indicated dotted lines in FIG. 5. As shown in FIG. 8, when the fitting opening 201 is closed, the projections 401 of the first cover 105 are temporarily clamped in the guide slots 409 by the first stop projections 800.

Because the fitting opening 201 of the roof garnish 101 may be opened as described above, the roof rack mounting apparatus according to the present embodiment may be opened by a single operation process. In addition, because the roof rack mounting apparatus according to the present embodiment may be closed by performing the above-mentioned process in the reversed order, the roof rack mounting apparatus is convenient to use.

According to an embodiment of present invention, a roof garnish 101 can be mounted regardless of whether a mounting bracket for mounting a roof rack is provided: It is unnecessary to separately fabricate a garnish for use when a roof rack is mounted and a garnish for use when no roof rack is mounted.

Although an embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for mounting roof rack comprising:
   a roof garnish formed to be clamped on a vehicle panel, wherein the roof garnish comprises a fitting opening formed through the top portion thereof,
   a shutter mounted in the fitting opening to be capable of opening and closing the fitting opening, wherein the shutter comprises a first cover and a second cover pivotally connected to each other by means of a pin, the first cover having projections integrally formed at the opposite ends thereof for clamping and sliding the first cover;
   a pair of guides mounted on the roof garnish to be spaced from each other at a predetermined distance, each guide having a guide slot formed in a curved shape for allowing the first and second covers to be smoothly pivoted about the pin, and a pair of clamping projections formed adjacent opposite ends of the guide slot; and
   a mounting bracket fixed on the vehicle panel underneath the fitting opening, wherein the mounting bracket is configured to allow the roof rack to be mounted on the mounting bracket,
   wherein the first cover of the shutter is pivotally engaged in the guide slots formed in the guides and the second cover is pivotally connected to the first cover, and
   wherein the second cover of the shutter is folded over the first cover or horizontally extended from the first cover, so that the fitting opening can be opened or closed.

2. An apparatus as claimed in claim 1, wherein each guide has first and second stop projections protruding into the corresponding guide slot.

* * * * *